Feb. 9, 1971  V. J. EVICH  3,561,044
AUTOMATIC DRESSING APPARATUS
Filed Feb. 17, 1969  2 Sheets-Sheet 1
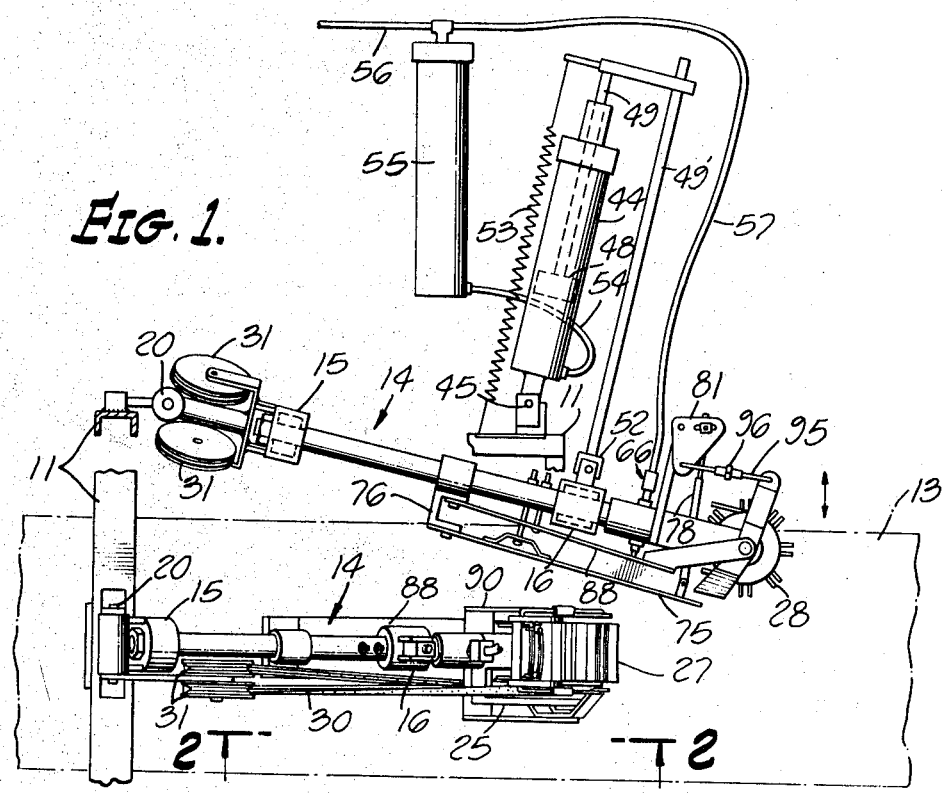
FIG. 1.
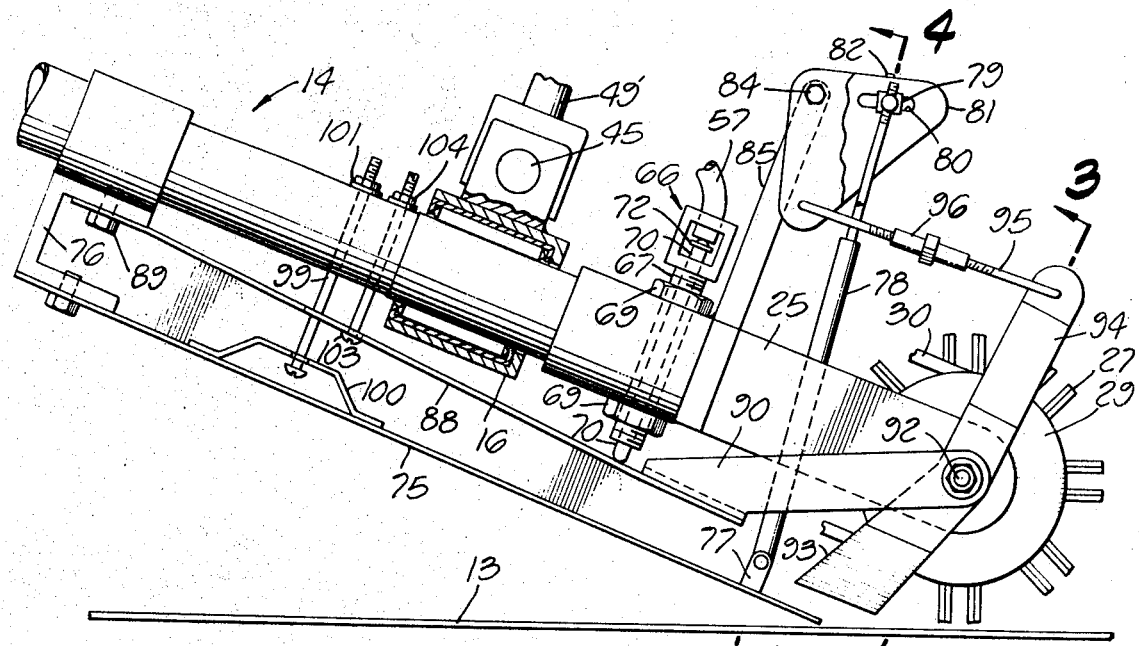
FIG. 2.
INVENTOR.
VINCENT J. EVICH
BY 
ATTORNEYS Feb. 9, 1971 V. J. EVICH 3,561,044
AUTOMATIC DRESSING APPARATUS
Filed Feb. 17, 1969 2 Sheets-Sheet 2
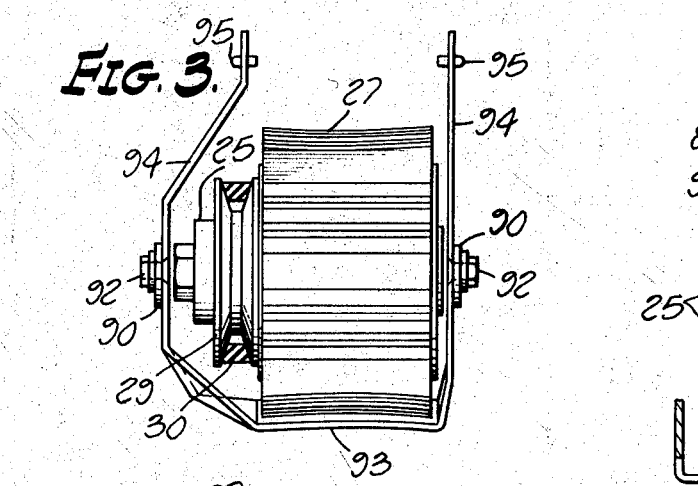
FIG. 3.
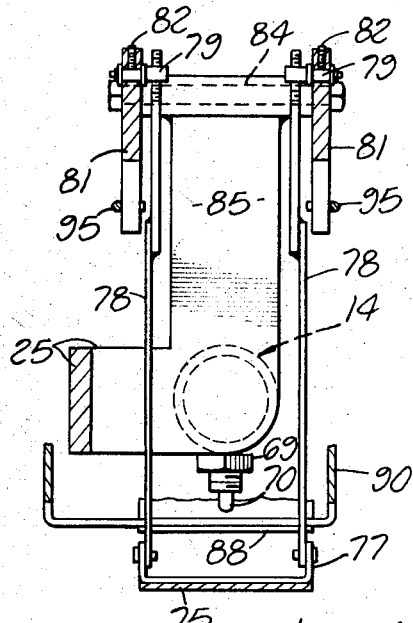
FIG. 4.
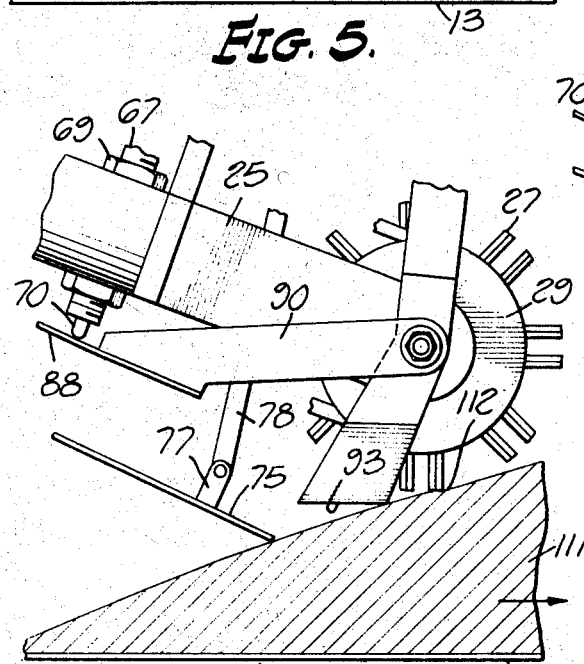
FIG. 5.
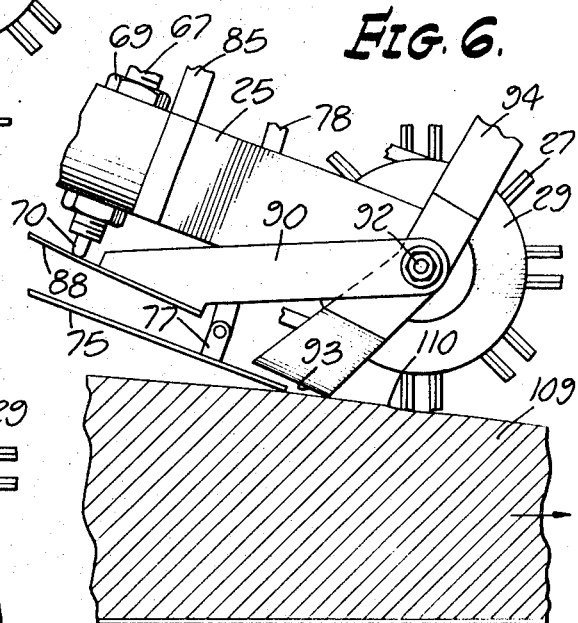
FIG. 6.
FIG. 7.
INVENTOR.
VINCENT J. EVICH
BY
ATTORNEYS.

United States Patent Office 3,561,044
Patented Feb. 9, 1971

3,561,044
AUTOMATIC DRESSING APPARATUS
Vincent J. Evich, 1315 Leland St.,
San Pedro, Calif. 90731
Filed Feb. 17, 1969, Ser. No. 799,706
Int. Cl. A22c 25/14
U.S. Cl. 17—54                                  24 Claims

ABSTRACT OF THE DISCLOSURE

Fish dressing apparatus for removing skin to a predetermined depth as the fish is conveyed past a series of dressing rolls independently movable toward and away from the changing contour of the fish. Each roll is positioned by power means responsive to a master sensor subject to finer adjusting control by a more delicate servo sensor. The individual dressing rolls are also mounted for self-adjusting pivotal movement about an axis normal to the axis of rotation of the dressing roll thereby permitting the rolls to pivot as necessary to accommodate changes in the transverse contour of the fillet.

---

This invention relates to meat dressing apparatus and more particularly to an improved fully automatic machine for dressing fish fillets by removing a layer of predetermined thickness from the fillets irrespective of wide variations in their size and shape as the fillets are advanced past the dressing station.

The present apparatus is related to that shown in my U.S. Pat. 3,076,997, granted Feb. 12, 1963, and embodies an improved mechanism for sensing the approach of fish into dressing position and for continuously determining the shape and angular disposition of the surface about to be dressed and for transmitting an appropriate control signal through means regulating the position of the power driven dressing mechanism. While the earlier dressing machine was found to perform commendably and to dress away a surface layer of fish fillets, it is subject to certain deficiencies sought to be avoided by the present invention. For example, the prior dressing apparatus, when adjusted to remove a minimum thickness layer from all parts of the surface to be dressed, is found to remove layers of excessive thickness at times and under certain conditions—particularly from surfaces inclined more sharply to the conveyor surface. This is because the sensing mechanism does not compensate as fully and as accurately as is desirable for angular changes in the surface of the fillets relative to a datum plane, such as the horizontal surface of the conveyor. For example, the layer removed from a surface parallel to the datum plane will be of the desired thinness whereas portions removed from the tail end surfaces inclined acutely to the datum plane may be excessively thick and wasteful of the meat. Additionally, it is found that the angular movement of the arm supporting the dressing roll in my prior construction adversely affects the operation of the sensing control mechanism.

It is, therefore, a primary purpose of the present invention to avoid the foregoing and other shortcomings of prior dressing apparatus and to provide a more sensitive and accurate control mechanism for regulating the position of the dressing means. These ends are accomplished according to the present invention by the provision of a master control means operating in conjunction with a servo control floatingly carried by the movable support means for the dressing tool. The servo control means includes a pivoting sensing shoe which is movable to different positions relative to the area being dressed and functioning to compensate for the changing positions of the arm supporting the dressing tool as well as for varying angles of the surface undergoing dressing relative to the datum plane. This sensing shoe is mounted for pivotal movement generally about the axis of the dressing tool and pivots toward and away from the vertical plane through this axis depending upon the height of the dressing tool above the datum plane as well as the angle of the surface being dressed to this datum plane. A fluid motor is employed to adjust the position to the dressing roll and the sluggishness of this motor when initiating a change of position is largely overcome by the use of a suitable fluid, as oil, to operate the motor, the pressure being applied to the oil charge by regulating the effective pressure of pressurized gas. The servo control mechanism is effective to regulate the venting of this pressurized gas to the atmosphere thereby to regulate the fluid pressure actuating the adjusting motor for the dressing tool. Additionally, the dressing means is preferably supported for swiveling movement about an axis generally normal to its own axis thereby to accommodate itself to changing transverse contours of the item undergoing dressing.

Accordingly, it is a primary object of the invention to provide an improved automatic fish dressing apparatus having improved high-accuracy, high-sensitivity control operating to adjust the dressing tool to remove a layer of predetermined thickness from fish undergoing dressing.

Another object of the invention is the provision of power driven fish-dressing apparatus having a power driven dressing tool regulated by servo control mechanism in contact with fish undergoing dressing and responsive to the changing contour of the fish to dress away a layer of substantially uniform thickness irrespective of widely varying changes in the size and shape of the fish undergoing dressing.

Another object of the invention is the provision of self-adjusting fish dressing apparatus having a rotating dressing tool supported for limited pivoting movement toward and away from fish conveyed therepast as well as about an axis extending generally lengthwise of the path of fish movement.

Another object of the invention is the provision of high-sensitivity control mechanism for fish-dressing apparatus and utilizing a master control in combination with servo-control mechanism to adjust a power driven dressing tool and including a sensing shoe carried by the servo control means automatically adjustable as a fish fillet advances to compensate for angular changes between the surface being dressed and a datum plane.

These and other more specific objects will appear upon reading the following specification and claims and upon considering in connection therewith the attached drawings to which they relate.

Referring now to the drawings in which a preferred embodiment of the invention is illustrated.

FIG. 1 is a fragmentary top plan view showing two typical power driven dressing tools and their operating relationship to the conveyor belt;

FIG. 2 is a fragmentary elevational view taken on an enlarged scale along line 2—2 on FIG. 1 and showing the control components in the position occupied with no fish undergoing dressing;

FIG. 3 is a fragmentary view partly in section taken along line 3—3 on FIG. 2;

FIG. 4 is a cross-sectional view through the control mechanism taken along line 4—4 on FIG. 2;

FIG. 5 is a fragmentary side elevational view showing the position of the control components and the dressing roll as the thick end of a fish fillet approaches the dressing tool;

FIG. 6 is a view similar to FIG. 5 but showing the position of the parts as a fish fillet advances tail first past the dressing tool; and FIG. 7 is a view similar to FIG. 6 but showing the position of the parts while the tail end of a fillet is being dressed if advanced head first past the dressing tool.

It will be understood that the fish-dressing apparatus to which the present invention relates is constructed generally similarly to that disclosed in my U.S. Pat. 3,076,997 and includes a main frame indicated at 11 in FIG. 1 suitably arranged to support a horizontally disposed conveyor belt 13 operating to convey the fish fillets to be dressed toward the right as viewed in FIG. 1. Main frame 11 also supports a plurality of pivotally-mounted dressing tools each having a rotating brush roll arranged to remove a thin layer of the fish as it moves past these rolls. To this end, the individual brush rolls 27, 28 are mounted on rigid supporting arms 14, 14 pivotally connected to the main frame 11 by pivoting couplings 20 having their axes at right angles to arms 14. In addition, arms 14 swivel about their own axes in anti-friction bearing assemblies of any suitable construction as, for example, that indicated at 15. A second anti-friction bearing 16 (FIGS. 1 and 2) embraces the outer end of each arm 14 and will be described more fully presently. It will be understood that bearings 15, 16 permit arm 14 to swivel about its own longitudinal axis whereas coupling 20 permits the outer free end of these arms to pivot toward and away from fish fillet being conveyed therepast on conveyor 13. For example, the lowermost arm 14 in FIG. 1 supporting dressing roll 27 is pivotally connected to frame 11 by bracket means 20 to permit the dressing roll to move in a vertical plane toward and away from conveyor belt 13. The upper arm 14 in FIG. 1 on the other hand, is movable in a substantially horizontal plane about a pivot connection 20 with one vertical side of frame 11 and such that its dressing roll 28 can move generally horizontally toward and away from one lateral side of a fish fillet on the conveyor belt.

Referring to FIGS. 3, 4 and 5, it will be understood that each dressing roll, as 27, is rotatably mounted upon a shaft held fixedly secured to one leg of an L-shaped bracket 25 (FIG. 4) having its other leg fixed to the end of the rigid arm 14 swiveling within bearings 15, 16. Dressing roll 27 may be constructed in any suitable manner such as that described in detail in the aforementioned patent and preferably includes a plurality of rows of resilient but reasonably stiff bristles having their ends contoured lengthwise of the rolls to conform generally with the shape of the fish surface to be dressed. Affixed to one end of the dressing roll is a pulley 29 (FIG. 3) supporting a driving belt 30 which is trained over pulleys 31 (FIG. 1) and connected through a suitable drive shaft to a driving motor, not shown. Pulleys 31 are located close to the pivot axis of arms 14 and permit these arms to be moved through their operating range without varying the tension of the driving belt. Moreover, and importantly, the tension in belts 30 permit limited swiveling of the dressing rolls 27, 28 in bearings 15, 16 while biasing them to their normal neutral positions.

The outer or free ends of the tool supporting arms 14 are pivoted toward and away from fillet on conveyor 13 by a fluid motor here shown as comprising a cylinder 44 having its lower end pivotally connected at 45 to main frame 11 of the apparatus. Slidably supported within cylinder 44 is a piston 48 having a piston rod 49 extending through the upper end of the cylinder and rigidly secured to an L-shaped arm 49' having its lower end pivotally connected at 52 to bearing 16 supporting arm 14 of the dressing tool. A tension spring 53 is connected between arm 49' and main frame 11 and urges piston 48 toward its retracted position.

Piston 48 is extended by liquid or a gas, such as oil or air, supplied to its lower end by a flexible hose 54 connected to a reservoir 55. If a charge of oil is employed below piston 48, the oil provides a dampening effect on the piston particularly at the moment the piston starts to move relative to cylinder 44 and results in smoother and less jerky operation. Oil is preferred where fine control of the dressing tool is desirable. With certain types of fish, fine control is not essential and, in such cases, air is preferred in lieu of the oil. Pressurized gas is supplied to the upper end of this reservoir from a constant pressure supply source through a supply line 56 having an extension connection to the upper end of a bleeder valve 66 identical in construction with that described in my above-mentioned patent. This valve includes a threaded main body 67 held adjustably mounted in arm 16 by lock nuts 69. Slidably supported in body 67 is a plunger 70 having a precision throttle valve 72 at its upper end movable toward and away from the valve seat mounted in the end of hose 57. The opposite sides of the valve body adjacent seat 72 are open with the result that any air escaping past the valve seat flows into the atmosphere.

The control means for adjusting bleeder valve 66 to meter the escape of pressurized air from hose 57 will be best understood by reference to FIGS. 2 and 4. This mechanism includes a master control 75 comprising a spring strip having one end anchored to arm 16 through a bracket 76. Secured to the forward end of master control 75 is a stirrup 77 having its ends pivotally connected to rods 78 extending upwardly along either side of arm 16 with their upper ends threaded into the ends of slide members 79. Slides 79 are adjustable lengthwise of slots 80 formed as shown in a bell crank 81, members 79 being anchored in a desired adjustable position along slots 80 by set screws 82. Bell crank 81 is pivotally supported on a shaft 84 mounted in a bracket 85 rigidly secured to arm 14.

The servo control comprises a leaf spring 88 having one end rigidly secured to bracket 76 by cap screw 89 and its free end bearing upwardly against the lower end of valve member 70 in the manner made clear by FIG. 2. Rigidly secured to the forward free end of servo control member 88 is a U-shaped bracket 90 having its arms straddling the length of dressing roll 27. Loosely and pivotally supported on pivot pins 92 carried in the ends of bracket 90 is a U-shaped sensing shoe 93. This sensing shoe has a wide sensing surface extending crosswise beneath the lower side of dressing roll 27 and includes upwardly extending arms 94 the mid-portions of which are journaled on pivot pins 92 and the upper ends of which are connected by a pair of links 95 to the lower end of bell crank 81. Each of links 95 preferably includes a turnbuckle 96 for adjusting its effective length.

An important aspect of servo control mechanism 88 is the fact that bracket 90 carried by its forward end and servo sensing shoe 93 pivoted thereto by pivot pins 92 are not mechanically connected in any way to dressing tool 27, but are resiliently supported on the free end of servo spring 88 and are free to move crosswise of the ends of this roll. This is made clear by FIG. 3 which shows the brush roll axis aligned with the axis of pivot pins 92 but disconnected therefrom. Normally the axis of pins 92 coincides substantially with the axis of the brush roll but during adjustment of the brush roll and of bleeder valve 66 it will be understood that these pivot axes 92 move out of alignment with the brush roll axis as motor 44 adjusts the dressing roll. Normally only very slight adjustment of the brush roll is necessary or effected at any one time.

It will be understood that master control 75 and servo control 88 preferably include adjustable stops best shown in FIG. 2. The adjustable stop for the master control includes a screw 99 having its shank extending loosely through a hole in a U-shaped member 100 secured to spring member 75. Its threaded end extends through a nut 101 welded or otherwise secured to arm 14.

The adjustable stop for servo control 88 likewise comprises a bolt 103 extending loosely through an opening in member 88 and having its threaded end engaged with a nut 104 likewise welded to arm 14. The upper ends of these screws may be provided with a kerf to receive a screwdriver or other suitable adjusting tool. Each of the adjustable stops 99 and 103 limits the downward movement of the associated one of members 75 and 88.

OPERATION

With no fish present at a dressing station, master control member 75 and servo control 88 flex to their retracted positions shown in FIG. 2 wherein valve 72 is wide open allowing pressurized gas to vent freely to the atmosphere past the seat at the end of hose 57. Under these conditions, the air is vented to the atmosphere faster than it is supplied through line 56, and spring 53 is effective to move piston 48 toward pivoted end 45. A suitable stop on piston rod 49, not shown, serves to limit the retraction movement with the dressing roll almost in contact with conveyor 13.

Let it now be assumed that the thick end of a fish fillet 108 approaches the dressing station from the left as indicated in FIG. 5. As the fillet advances, its blunt forward end contacts the resilient master control 75 flexing it upwardly into contact with the broad underside of sensing shoe 93. Rods 78 are thereby elevated to pivot bell crank 81 (FIG. 2) counterclockwise about pivot 84, a movement which operates through links 96 on the upper ends of arms 94 to pivot sensing shoe 93 through a short arc clockwise of pivot 92. At the same time the contact of the foremost end of master control spring 75 with sensing shoe 93 acts through pivot 92 and bracket 90 to flex servo control spring 88 upwardly elevating plunger 70 and valve 72 to throttle the escape of air from hose 57. As the air pressure builds up in hose 57, it is effective to force oil from reservoir 55 into the lower end of cylinder 44 to extend piston 48 and pivot the dressing roll support arm 16 about its pivot 22. So long as pressure is applied to sensing shoe 93 to deflect it away from its normal neutral position, the position of bleeder valve 70 regulates the air vented to the atmosphere past valve 72. Accordingly, as the fillet 108 continues to advance sufficient pressure is applied to both of the sensing controls in the manner just described to maintain the bleeder valve 72 closed or substantially closed with the result that the dressing roll is moved rapidly away from the conveyor and in proper operating position to contact the upper surface of the fillet as the latter reaches contact with the dressing fingers of roll 27.

Once the advance end of the fillet passes beyond the right end of master control 75 it comes into contact with sensing shoe 93 the leading end of which is closer to the conveyor than the end of master control 75. Accordingly, the sensing shoe then cooperates with the underlying surface of the fillet and is thereafter primarily responsible in controlling bleeder valve 70. Master control 75 remains in contact with the fillet surface but now functions in cooperation with the sensing shoe in sensing changes in the angular disposition of the surface undergoing dressing relative to the conveyor serving as a datum plane. This highly important aspect of the invention will be better understood in connection with the following description of FIGS. 6 and 7.

Referring first to FIG. 6 showing a fillet 109 advancing tail first past the dressing roll, it will be observed that the upper surface is inclined downwardly toward the forward end of the conveyor. Under these circumstances sensing shoe 93 is in contact with the fillet close to the area 110 actually undergoing dressing, it being noted that this area is somewhat rearward of a vertical plane passing through the axis of the dressing roll. The forward end of master control 75 is also in contact with the fillet in a horizontal plane slightly above a similar plane through the point of contact of shoe 93 with the fillet. Under these conditions the master control is effective through linkage 78, 81, 95, 94 to pivot the sensing shoe clockwise and in the amount representative of the angle of forward inclination of the surface being dressed. At the same time, sensing shoe 93 operates in conjunction with servo control lever 88 to provide high-sensitivity fine control of the bleeder valve.

Referring now to FIG. 7 showing the dressing roll in operation to dress the tail end of a fillet 111, it will be noted that the point of contact of master control 75 with the fillet is on a plane materially below the contact point of shoe 93 with the fillet. In consequence, the master control is effective through its linkage 78, 81, 95 and 94 to rotate the sensing shoe counterclockwise with its leading edge closer to a vertical plane through the dressing roll axis than under the conditions referred to above in FIG. 6. It will be observed that the area 112 undergoing dressing is now located forwardly of a vertical plane through the dressing roll axis and that the sensing shoe has been rotated, as it always is, to remain as close as feasible to the area being dressed.

It will be appreciated from the foregoing detailed description that there is a wide variation between the relative positions of the two main sensing controls 75 and 88, the principal functions of the master control being to cooperate with the sensing shoe 93 in sensing the direction and magnitude of the inclination of the surface to be dressed relative to a datum plane and to shift the position of the sensing shoe to maintain it close to the area undergoing dressing under all operating conditions. It will be further appreciated that the sensing shoe is floatingly supported for pivotal movement about the general vicinity of the dressing roll axis yet free to move slightly above and below this axis as necessary for the precise control of the power operated means controlling the position of the dressing roll.

In addition to the foregoing description of the manner in which the invention machine functions to adjust the dressing rolls toward and away from the fillet as the thickness varies from end to end thereof, it is also evident that the swiveling movement provided by bearings 15, 16 permit arms 14 to pivot thereby allowing the individual dressing rolls to rock about a pivot normal to their roll axes, namely in planes extending generally transversely of the travel path of the fillets. In this manner the dressing rolls automatically adjust to dress to substantially the same depth at either end thereof despite the changing transverse contour of the fillets. In so pivoting away from their normal neutral positions, the driving belts are tensioned perceptibly and sufficiently to provide a force effective to restore the rolls automatically to their neutral position.

While the particular automatic dressing apparatus herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. Servo-controlled dressing mechanism for use in dressing a layer of predetermined thickness from fish and the like while moving past the dressing mechanism, said mechanism including a power-driven dresser, power means for controlling the position of said dresser relative to the surface of fish undergoing dressing, master control means positioned to be contacted by fish approaching said dresser, servo sensing means positioned to be contacted by fish undergoing dressing at a point downstream from the point of contact of said master control means with fish and including an operating connection to said master control means, and means responsive to the movement of said servo sensing means to control the power means and to change the position of said dresser as necessary to remove a layer of predetermined thickness from the fish irrespective of wide variation in the size and configuration of the fish.

2. Fish dressing mechanism as defined in claim 1 characterized in the provision of means normally biasing said master control means and said servo control means individually toward and into light pressure contact with fish closely upstream from the area undergoing dressing.

3. Fish dressing mechanism as defined in claim 1 characterized in that said power means for controlling the position of said dresser comprises fluid-operated motor means, and said servo control means for said fluid-operated motor means including means for controlling the flow of fluid to said motor means.

4. Fish dressing mechanism as defined in claim 1 characterized in that said servo control means includes movable sensing means movable to different positions lengthwise of the direction of movement of fish undergoing dressing, and said operating connection between said master control means and said servo control means being operable to adjust the position of said adjustable sensing means in accordance with changes in the inclination of the fish surface undergoing dressing relative to a fixed datum plane.

5. Fish dressing mechanism as defined in claim 4 characterized in that said dresser includes a rotary means, and said movable sensing means being pivotable generally about the axis of rotary dresser means.

6. Fish dressing mechanism as defined in claim 1 characterized in that said power means controlling the position of said dresser includes a fluid-operated cylinder and piston, a liquid-charged reservoir connected to one end of said cylinder, means for supplying a gaseous fluid under constant pressure to said reservoir, and said servo-responsive control means including bleeder valve means for bleeding variable amounts of gaseous fluid from said fluid supply means thereby to control and vary the pressure in said cylinder and the position of the piston therein.

7. Fish dressing mechanism as defined in claim 1 characterized in the provision of means for varying the thickness of the layer removed from the fish by said dresser.

8. Fish dressing mechanism as defined in claim 1 characterized in the provision of means for adjusting the position of said servo control means relative to the control means for said dresser.

9. Servo controlled dressing mechanism for use in removing a layer of predetermined thickness from moving fish, said mechanism comprising: power driven dressing means having power operated means supporting the same for movement toward and away from fish in transit therepast, master control means positioned in the path of advancing fish and movable to different positions transversely of the path of advancing fish depending on the thickness of the leading end of the fish, and servo control means including a sensor positioned to sense the changing contour of the fish while advanced therepast and effective in response to sensed contour changes to transmit a control signal to said power operated support means for said dressing means to position said dressing means in the precise position required to remove a layer of predetermined thickness from the fish advancing therepast.

10. Servo controlled dressing mechanism as defined in claim 9 characterized in that said dressing means includes a pivoting arm having a rotary dressing roll on the face thereof, said master control means and said servo control means being carried by and movable with said pivoting arm, and said servo control means including pivoting sensing means having a pivot axis adjacent the axis of said dressing roll and fish contour sensing means spaced closely adjacent the surface undergoing dressing, and said master control means being operable in response to a change in the inclination of the fish surface about to be dressed to change the position of said sensing means clockwise and counterclockwise of the axis of said dressing roll.

11. Servo controlled dressing mechanism as defined in claim 9 charatcerized in that said master control means is normally out of contact with said servo control means, and said master control means being engageable by fish advancing toward dressing position and movable thereby into contact with said servo control means to shift said dressing means into proper position to dress the advance thick end of a fish as the same reaches dressing position.

12. Servo-controlled dressing mechanism as defined in claim 9 characterized in the provision of a plurality of said power driven dressing means each equipped with master control means and servo control means and arranged to dress different longitudinal strip areas of fish as the latter are conveyed therepast.

13. Servo-controlled dressing mechanism as defined in claim 10 characterized in that said pivoting sensing means comprises a U-shaped shoe embracing said dressing roll and having legs extending across the opposite ends of said roll and including pivot connections with said servo control means which pivot connections are aligned generally with the axis of said dressing roll.

14. Servo-controlled dressing mechanism as defined in claim 9 characterized in that said master control means includes means for shifting said sensor circumferentially of said dressing means in accordance with the direction and magnitude of the inclination of the surface undergoing dressing relative to the plane of travel of the fish being dressed.

15. Dressing mechanism as defined in claim 1 characterized in the provision of means for swively supporting said power driven dresser for limited swiveling movement in a plane extending crosswise of the path of movement of fish therepast whereby said dresser can swivel as necessary to accommodate the changing transverse contour of the fish.

16. Dressing mechanism as defined in claim 15 characterized in the provision of resilient means normally biasing said power driven dresser to a preselected neutral position.

17. Dressing mechanism as defined in claim 15 characterized in that the last mentioned means swively supporting said dresser also supports said servo-sensing means for swiveling movement in phase with said dresser.

18. Fish dressing mechanism for dressing away a layer of selected depth from fish fillets, said mechanism comprising means for advancing fillet past a dressing station equipped with power-rotated dressing roll means, means adjustably supporting said dressing roll means for movement toward and away from the surface of a fillet of varying thickness as the same is conveyed therepast, said last mentioned means including means swively supporting said dressing roll means for free tilting movement of its rotational axis in a plane crosswise of the path of fillet advance whereby said dressing roll means pivots as necessary to accommodate itself to changing transverse contours of the fillet.

19. Fish dressing mechanism as defined in claim 18 characterized in that said swively-supported dressing roll means includes biasing means normally effective to hold said dressing roll means in a preselected neutral position but permitting the same to swivel freely in either direction away from said neutral position.

20. Fish dressing mechanism as defined in claim 19 characterized in that said power-rotated dressing roll means includes a resilient driving belt to drive the same, the resiliency of said driving belt being utilized to bias said dressing roll means to its neutral position, said driving belt being so arranged that the tension therein is increased slightly as said dressing roll means is swiveled in either direction away from its neutral position, and the resistance to swiveling movement of said dressing roll means being adjustable by varying the tension in said resilient belt.

21. Fish dressing mechanism as defined in claim 18 characterized in that said dressing roll means is equipped with a multiplicity of stiff bristles effective to dress away a thin exterior layer of uniform thickness of a fish fillet as the fillet moves past the rotating dressing roll means.

22. Fish dressing mechanism as defined in claim 21 characterized in the provision of a plurality of similarly constructed and operated dressing roll means supported for independent pivotal and free tilting movement and arranged to remove separate side-by-side strip layers from the exterior of a fish fillet as the latter is conveyed past said plurality of dressing roll means.

23. Fish dressing mechanism as defined in claim 22 characterized in that said plurality of dressing roll means includes means for supporting the same in an arc extending crosswise of the path of movement therepast of fish fillets undergoing dressing.

24. Fish dressing mechanism as defined in claim 23 characterized in the provision of power driven conveyor means for conveying fish fillets beneath and past said plurality of dressing roll means.

References Cited

UNITED STATES PATENTS 3,076,997  2/1963  Evich _____ 17—54

FOREIGN PATENTS 386,878  1/1933  Great Britain _____ 17—54

LUCIE H. LANDENSLAGER, Primary Examiner

U.S. Cl. X.R.

17—58